United States Patent [19]

Schwaegerle

[11] Patent Number: 5,747,556
[45] Date of Patent: May 5, 1998

[54] OPACIFIED PEARLESCENT MULTILAYER LOUVER FOR VERTICLE BLINDS

[75] Inventor: Paul Robert Schwaegerle, Oberlin, Ohio

[73] Assignee: The Geon Company, Avonlake, Ohio

[21] Appl. No.: 1,993

[22] Filed: Jan. 8, 1993

Related U.S. Application Data

[63] Continuation of Ser. No. 858,385, Mar. 25, 1992, Pat. No. 5,194,209.
[51] Int. Cl.$^6$ ........................................................... C09D 5/29
[52] U.S. Cl. ........................... 523/171; 524/425; 524/427
[58] Field of Search ............................. 523/171; 524/425, 524/427

[56] References Cited

U.S. PATENT DOCUMENTS

| | | | |
|---|---|---|---|
| 3,188,263 | 6/1965 | Pflaumer | 524/425 |
| 3,313,753 | 4/1967 | Roberts et al. | 524/425 |
| 3,316,198 | 4/1967 | Van Gorder et al. | 524/425 |
| 3,326,739 | 6/1967 | Brennan et al. | 524/425 |
| 3,361,704 | 1/1968 | Benning et al. | 524/425 |
| 3,819,566 | 6/1974 | Pinsky et al. | 524/449 |
| 4,249,953 | 2/1981 | Keifer et al. | 524/423 |
| 4,753,829 | 6/1988 | Panush | 523/171 |
| 4,780,364 | 10/1988 | Wade et al. | 428/315.5 |

*Primary Examiner*—Vasu Jagannathan
*Assistant Examiner*—Olga Asinovsky
*Attorney, Agent, or Firm*—Miles B. Dearth; Joe A. Powell

[57] ABSTRACT

Opacified Pearlescent Compounds for Making an elongate louver or assembly of louvers having an improved multi-layer louver configuration comprising an opacified pearlescent outer layer having a claimed range of opacity which substantially or completely occludes an base layer, the increased opacity substantially reduces or eliminates perceptible non-uniformity in coloration, shade change and thickness of the outer layer, while improving resistance to yellowing, processing characteristics, and raw material cost economics.

2 Claims, 1 Drawing Sheet

OPACIFIED PEARLESCENT MULTILAYER LOUVER FOR VERTICLE BLINDS

This is a Continuation of Ser. No. 07/858,385 filed Mar. 25, 1992 now U.S. Pat. No. 5,194,209.

BACKGROUND OF THE INVENTION

The present invention is directed to novel louvered assemblies for window coverings, and more particularly relates to multilayer verticle louver assemblies having an improved opacified pearlescent outer layer.

Over the last few decades, vertical louvered systems have become popular. Typical vertical louvered assemblies comprise relatively thin, elongated vertical hanging slats which are suspended and depend vertically from a mechanism which aligns and orients the slats. Typically the depending slats overlap slightly and can be rotated in unison to infinitely adjust the light or view through the opening. The slats are made from a wide variety of materials including extruded vinyl strips and are optionally decorated by attaching webs, narrow woven or slit fabrics, or laminated films.

Related to the present invention are vertical slat assemblies involving combinations of a slat member and a decorative member which is inserted thereupon to the face, back or both sides of the slat with attachment means. The vertical louver described in U.S. Pat. No. 4,049,038 ('038) comprises lateral inwardly facing attachment means which are flanges on one or both faces of the slat which will receive an insert such as a strip of wallpaper or fabric. U.S. Pat. No. 4,628,980 ('980) discloses a louver of identical shape to '038 but incorporates co-extruded transparent flanges. The patentable difference between '038 and '980 is the transparency of the lateral flanges which are less obtrusive. In commercial practice, such louvers are made by the co-extrusion of a clear thermoplastic compound for the lateral flanges with an opaque compound for the rest of the slat.

A Material of choice for co-extruded louver slats of this type is polyvinyl chloride due to the favorable cost/performance properties of this commodity thermoplastic resin.

U.S. Pat. No. 4,195,680 discloses decorative attachments to an '038 flanged louver comprising one or more multiple clear or translucent tinted film inserts which allow convenient color changes. Variations in color are achieved by attaching one or more inserts each of which have different colors and together form a new color.

A pertinent reference relative to the present invention, U.S. Pat. No. 4,877,077 ('077) discloses a verticle louver made from co-extruded vinyl thermoplastic wherein a transparent outer layer containing a pearlescent pigment is co-extruded with an opaque base layer. The opaque base layer is visible and reflects light through the pearlescent surface layer. Optionally a transparent or translucent tinting color dye is incorporated in the outer layer.

The approach disclosed in '077 has several shortcomings. First, due to the restriction of transparency, the resulting perceived color of the pearlescent surface is a combination of the colors making up the transparent layer and the color of the opaque base layer. The appearance of the louvers are sensitive to minute variations in the coating thickness which can create the appearance of undesirable streaking for instance. Imperfections in the consistency of the extruded compound such as polymer gells are more likely to occur in compounds having low filler or pigment levels in the pearlescent layer yet the '077 patent teaches the requirement of using a clear transparent compound in order to provide the basis for obtaining a pearlescent effect.

Secondly, transparent thermoplastic materials including vinyl based polymers are susceptible to degradation and yellowing when exposed to ultraviolet radiation from the sun or fluorescent lights if not adequately protected. This is particularly problematic where sections of the louver ensemble receive varying levels of exposure. Non-uniformity in the thickness of a transparent outer layer can lead to perceptible streaking after yellowing occurs even where the entire surface has been uniformly exposed.

Accordingly, it would be desirable to devise a pearlescent multilayered louver not having the aforementioned drawbacks.

SUMMARY OF THE INVENTION

It is an aspect of the present invention to provide an improved multi-layer louver having an opacified outer layer within a narrow range of opacity which retains a pearlescent effect.

It is a further aspect of the present invention to provide a pearlescent outer layer which is opacified wherein the outer layer substantially or completely occludes a base layer.

It is a further aspect of the present invention to provide a pearlescent outer layer having a degree of opacification within the claimed range which substantially reduces or eliminates surface imperfections, yellowing, and the perceptibility of the effects of non-uniformity after long term exposure.

It is a further aspect of the present invention to provide an improved pearlescent compound having higher consistency of quality, reduced material cost and improved melt processing properties for use the multi-layer louver by incorporating opacifying pigment in the outer layer optionally in combination with particulate fillers.

The present invention specifically encompasses the discovery of a narrow range of opacity for a pearlescent outer layer of a multi-layer louver wherein a pearlescent luster is retained yet irregularities in the coloration, noticeable variation in the thickness of the outer layer, and other imperfections are substantially or completely eliminated or at least increasingly hidden from view as opposed to when a prior art outer layer is based on a pearlescent clear transparent compound. In addition to improved consistency of appearance, the present invention enables improvement in the processing characteristics of the extrudate, improvements in raw material costs and improved inherent long term aging properties by the incorporation of protective UV/visible light absorbing pigments in the pearlescent outer layer of a multi-layer louver.

It is desirable and advantageous to substantially or completely eliminate visually perceptible imperfections such as polymer gels or streaking caused by incomplete dispersion and thickness variation respectively in the extrudate as frequently occurs in commercial practice. It was expected that opacification of the outer layer would destroy the pearlescent luster, however, a narrow range in the light transmittance through the outer layer was discovered which allows an acceptable retention of pearlescent luster thereby providing the aforesaid improvements.

Other objects and advantages of the present invention will become apparent from the following detailed description taken in conjunction with the accompanying drawings.

DESCRIPTION OF THE PREFERRED EMBODIMENTS

Figure 1:
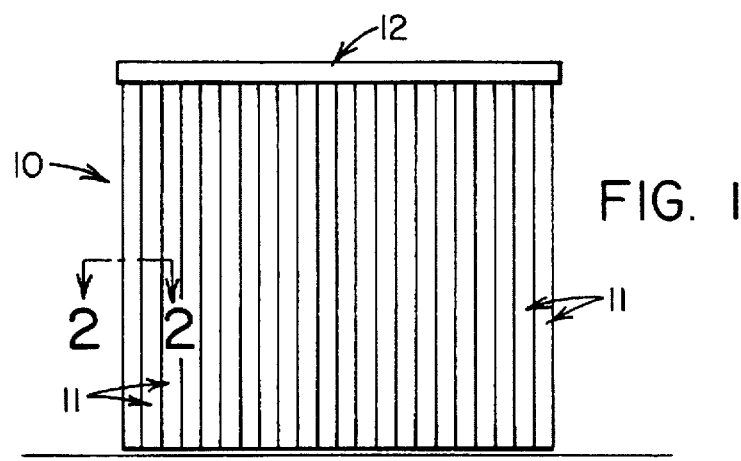
FIG. 1 is an elevation view of a vertical louver assembly system.

A louver system 10 illustrated in FIG. 1 comprises a plurality of louvers 11 held vertically by a louver track system 12. Louvers 11 depend from the track system and are movably aligned. Generally louver track systems allow for rotation of the aligned louvers in unison for adjustment of the light or view through the opening and allow for gathering together at one end similar to the gathering of cloth draperies.

Figure 2:
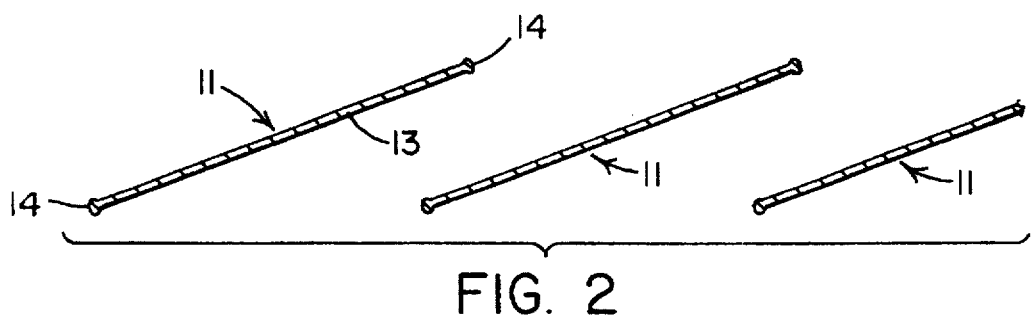
FIG. 2 is an enlarged sectional view taken approximately on line 1B.
Figure 3:
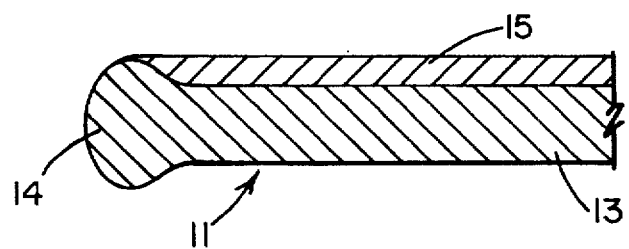
FIG. 3 is a further enlarged sectional view of one end of the multilayer louver slat of FIG. 2 as seen within viewing circle A of FIG. 2 wherein a two layer embodiment of a louver is illustrated.

As indicated above, the invention involves a combination of integral combined layers in a louver slat for producing a pearlescent effect. The enlarged section view of the multilayer slat of FIG. 2 within viewing circle A is illustrated in FIG. 3 wherein there is seen the lateral section of louver 11. In reference to louver 11 in FIG. 3, there is shown a base layer 13 having lateral edge 14. Lateral edge 14 on each side of the base layer 13 generally will have a rounded or an elliptical cross section. This eliminates sharp edges and can alternatively provide a structural stiffening effect if made prominent. The multilayer slat of FIG. 3 has an opacified, pearlescent upper layer 15.

Opacified upper layer 15 within the claimed range of opacity substantially occludes base layer 13 depending on the level of opacity. This is in contrast to the prior art clear transparent pearlescent outer layer which allows higher light transmission through the outer layer which reflects from the base layer at the interface between the layers. Therefore, when employing an opacified outer layer, any coloration present in the base layer contributes less perceptible color since transmission and reflection at the interface are reduced.

Figure 4:
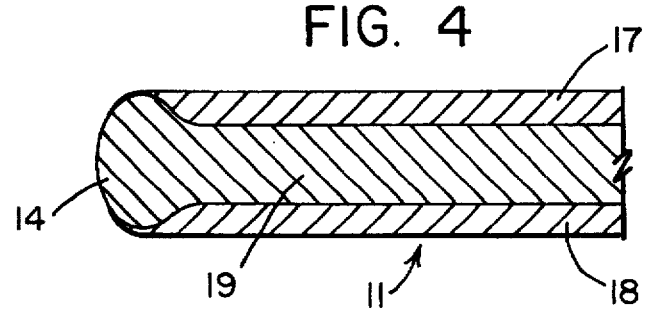
FIG. 4 is an enlarged section view of the same section of a louver of FIG. 2 as seen within viewing circle A of FIG. 2 wherein a three-layer embodiment of a louver is illustrated.

FIG. 4 depicts a multilayer louver having two outer layers 17 and 18 surrounding an opaque inner layer 19. One or both outer layers 17 and 18 may comprise an opacified pearlescent compound comprising pearlescent pigment in combination with opacifying pigment and optionally filler or color pigments.

Preferably the base layer 13 or 19 is of a light shade. The opacified upper layer has pearlescent pigmentation, opacifying pigment and alternatively can be colored with the addition of light pastel dispersed pigments for example. The opacified upper layer has a pearlescent pigment in amounts effective to give the desired level of pearlescent appearance. The opacifying pigment is present in the opacified upper layer in effective amounts to give the desired opacity for a given thickness of the upper layer.

Transparent tinting dyes are not as effective in providing coloration in an opacified layer therefore these are not preferred in providing added coloration to the opacified outer layer of the louver. Opaque color pigments are more efficient in providing added coloration to the pearlescent layer therefore these are preferred when desired.

Louver slats generally are one to five inches wide, and typically 3.5 inches wide. The slats typically have a total thickness of from about 0.030 to about 0.035 inch in the medial portion. The multilayer slats of the present invention contain at least one outer layer which can contribute from about 0.003 to about 0.009 inch, preferably about 0.004–0.005 inch of the total web thickness. The rounded lateral edges form a circular or ellipsoid solid cylinder which is an integral portion of the base layer, and typically has a radius of curvature of about 0.025 inch. As seen in the example embodiment of FIG. 2, the thin pearlescent layer covers one surface of the base layer. A multilayer slat such as a two layer slat can alternatively be constructed as an insert to be placed on the face of an existing flanged louver such as an '038 type louver. In this instance, the insert is preferably thinner than the louver which it is inserted thereon, therefore the base layer will have a thickness of about 0.004 inch and the clear transparent pearlescent layer will have a thickness of about 0.007 totalling about 0.011 inch typically for an insert.

Pearlescent pigmentation referred to here means pigment having the sheen or luster of a pearl such as the oyster pearl. Pearl essences are well understood in the thermoplastic compounding art and a detailed description of the processes of isolating and purifying natural or synthetic pearl essences is beyond the scope of this disclosure. An example of a commercially available pearlescent pigment suitable for use in the outer layer of the louver herein described is available from The Mearl Corporation under the "Superwhite" Trademark.

The layers comprising the louver can be made from a variety of materials. For instance the base layer can consist of an aluminum strip and the outer layer can be a pearlescent paint based on a suitable binding matrix such as alkyd resin or urethane enamel. In this instance the outer layer is coated or applied to the base layer which is a substrate for the outer layer.

The resin of the outer layer in which the pearlescent pigment system and opacifying pigments are dispersed is referred to as a matrix. When the outer layer is made from a thermoplastic compound, the matrix is the thermoplastic resin in which the pigments are dispersed. A predominant thermoplastic matrix in commercial use is polyvinyl chloride. Polyvinyl chloride compounds are widely used in commercially available single layer extruded louvers. The preferred form of the multilayer louver therefore consists of coextruded thermoplastic compounds based on poly "vinyl" chloride. Typical opaque rigid vinyl compounds which are suitable for the base layer are GEON® 87408 and GEON® 87600 commercially available from B. F. Goodrich Company, Geon Vinyl Division, Cleveland, Ohio. These compounds consist essentially of 100 parts polyvinyl chloride polymer, about 1 part of thermal stabilizer, about 3 parts of processing aid, about 5 parts of lubricant, about 10 to 20 parts of calcium carbonate, about 5 to 15 parts of titanium dioxide and an effective amount of coloring pigment to provide the desired shade. Optionally, this compound can include an effective amount of impact modifier.

It has been previously disclosed a conventional pearlescent polyvinyl chloride compound based on a clear transparent vinyl compound suitable for a coextruded outer layer of a vinyl based louver. This compound is designated as GEON® 87513-028. Other than the pearlescent pigmentation, no opacifying pigment is present in this compound and U.S. Pat. No. 4,877,077 teaches the requirement that none be present. The novel pearlescent compounds of the present invention require the presence of added opacifying pigment in addition to pearlescent pigment in order to achieve the advantages hereinabove established.

The novel opacified pearlescent compounds of the present invention preferably contain 100 parts of polyvinyl chloride polymer, 2 to 3 parts of one or more heat and light stabilizers, 8 to 10 parts of impact modifier, 1 to 2 parts processing aid, 2 to 10 parts plasticizer 0.1 to 3 parts of titanium dioxide, an effective amount of pearlescent pigment and 0.5 to 1.5 parts of one or more lubricants.

One apparatus for producing co-extruded multilayer slats of the present invention is a conventional thermoplastic extrusion device incorporating slotted coextrusion dies for instance having internal passages which provide for combining of the layers before the extrudates reach the die tips under typical laminar melt flow. A slotted die can be fabricated by anyone skilled in that art and utilized in a conventional manner on conventional extrusion equipment to co-extrude the multilayer slats. Therefore a detailed discussion of this componentry is beyond the scope of the present disclosure. Those skilled in the art will recognize that the multilayer slats of this invention may be fabricated by a calendering process. In this process generally a fluxed compound is fed to a calender stack. The fluxing of the compound can be carried out in a continuous mixer. Typically a mixer such as a planetary gear extruder provides controlled delivery of heat and work input to the compound in order to achieve uniform feed rate, color, gage and surface quality in the calendering step. A brief outline of this process is provided in *Modern Plastics Encyclopedia*, McGraw-Hill Inc., New York (1988).

It is also anticipated that the method of fabrication of the louver of the present invention can include the extrusion of an opacified pearlescent outer layer over a metal base layer such as an aluminum strip. The aluminum can optionally be coated to provide white or any desired color. It is possible with the degree of opacification provided in the outer layer of the multilayer louver of the present invention to utilize a wide variety of materials comprising the base layer since the base layer is substantially occluded and receives substantially less incident light through the opacified outer layer. All of the anticipated variations of fabricating a multilayer louver having an opacified outer layer within the claimed range of opacity can be reduced to practice with a reasonable trial and error effort and such variations and approaches are understood as within the scope of this invention.

In the examples below, the control and experimental thermoplastic vinyl compounds were milled into films of 0.004 inch thickness. The reflectance ratio method of opacity determination was measured using a Photovolt Model 575 reflection and gloss meter following the procedures according to TAPPI useful method T 425 om-86. Examples 2–8 represent the series of opacified pearlescent outer layer compounds with varying amounts of added titanium dioxide listed below in weight percent based on the weight of the control. Visual inspection was made to determine the presence of pearlescent luster. The reported reflectance ratio was expressed as:

opacity=black reflectance/white reflectance X 100

EXAMPLES

| Example No. | TiO$_2$ Level Wt. % | % Reflectance White Black | | Opacity (B/W x 100) | Pearlescent Appearance |
|---|---|---|---|---|---|
| CONTROL | 0.0 | 68.1 | 35.3 | 51.8 | GOOD |
| 2 | 0.1 | 70.8 | 42.9 | 60.6 | GOOD |
| 3 | 0.2 | 72.5 | 46.5 | 64.1 | GOOD |
| 4 | 0.3 | 73.9 | 48.4 | 65.5 | GOOD |
| 5 | 0.5 | 75.0 | 53.2 | 70.9 | GOOD |
| 6 | 1.0 | 77.1 | 60.6 | 78.6 | GOOD |
| 7 | 2.0 | 79.9 | 70.2 | 87.9 | GOOD |
| 8 | 5.0 | 83.8 | 80.5 | 96.1 | POOR |

As can be seen from the table above, Examples 2–8 exhibit higher percent reflectance ratios compared to the control which is the prior art clear transparent pearlescent compound. The addition of titanium dioxide opacifying pigment in Examples 2–7 maintain an adequate pearlescent luster and also yield improvements in appearance and uniformity. At a percent reflectance ratio higher than about 90%, the pearlescent effect is no longer perceptible. A titanium dioxide level of 5% in Example 8 exhibited a 96.1% reflectance and the pearlescent luster was absent.

From the foregoing results, it appears that the presence of a perceptible pearl luster requires a minimum threshold level of light transmission through the outer layer which corresponds to an opacity of about 90% and below according the test method employed. This minimum light transmission provides sufficient intensity of light refraction over the distances between pearlescent particles within the outer layer producing the pearlescent effect. Such a relationship has not heretofore been disclosed pertaining to a multilayer louver. Moreover it has not heretofore been disclosed that pearlescent effects can be observed with the use of added opacity enhancing ingredients at the effective levels observed.

It is anticipated that any combination of opacifying enhancers can be used including opaque coloring pigments. Optionally, inert fillers not having efficient opacity enhancement can be included in combination with preferable opacifying pigment such as titanium dioxide.

In an alternative embodiment of the multilayer louver, the base layer is not pearlescent and not entirely opaque but can exhibit a reflectance ratio according to TAPPI method T 425 om-86 of between 0% and 99%. Alone, this base layer would appear translucent at lower reflectance ratios, however, it can contribute desired extent of light blocking properties in proportion to the opacifying pigmentation incorporated. Since the outer layer can exhibit up to about a 90% reflectance ratio at 4 mils, the outer layer will almost completely occlude the base layer and can contribute substantial blocking of light.

Due to the improved processing characteristics such as uniformity of dispersion, melt strength and smoothness of extrusion, it is preferred to include fillers such as calcium carbonate for example. As mentioned above, other advantages stem from the added opacifier(s) and filler(s) such as uniformity of color dispersion and reduction in the incidence of polymer gells.

Various changes and modifications may be made in carrying out the present invention without departing from the spirit and scope thereof. Insofar as these changes are within the purview of the appended claims, they are to be considered as part of the invention.

It is claimed:
1. An opacified pearlescent composition comprising:
    (a) at least one thermoplastic polymer matrix,
    (b) an effective amount of at least one pearlescent pigment for providing pearlescent luster, and
    (c) from 0.1 to 3 parts of titanium dioxide opacifying pigment per 100 parts by weight of said thermoplastic polymer, wherein a 4 mil thickness of said composition has a percent reflectance ratio according to TAPPT method T 425 OM-86 of from about 60% to about 90%.

2. A composition of claim 1 wherein said thermoplastic polymer is a polyvinyl chloride polymer.

* * * * *

UNITED STATES PATENT AND TRADEMARK OFFICE
CERTIFICATE OF CORRECTION

PATENT NO : 5,747,556
DATED : 5-5-98
INVENTOR(S): Paul Robert Schwaegerle

It is certified that error appears in the above-identified patent and that said Letters Patent is hereby corrected as shown below:

COLUMN 8, LINE 2: TAPPT should read TAPPI

Signed and Sealed this

Twenty-first Day of July, 1998

Attest:

Attesting Officer

BRUCE LEHMAN

*Commissioner of Patents and Trademarks*